(12) United States Patent
Eller et al.

(10) Patent No.: US 6,330,093 B1
(45) Date of Patent: *Dec. 11, 2001

(54) CONNECTOR INTERFACE FOR SPACECRAFT MODULES

(75) Inventors: Howard S. Eller, Redondo Beach; Ramon Coronel, Torrance; Gary T. Harkness, Hermosa Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/176,718

(22) Filed: Oct. 21, 1998

(51) Int. Cl.$^7$ .................................................. H04B 10/02

(52) U.S. Cl. ......................... 359/172; 359/163; 359/173
(58) Field of Search ................................. 359/163, 172, 359/173

(56) References Cited

U.S. PATENT DOCUMENTS

| | | | |
|---|---|---|---|
| 4,395,004 | * 7/1983 | Ganssle et al. | 244/158 R |
| 5,152,482 | 10/1992 | Perkins et al. | |
| 5,271,582 | * 12/1993 | Perkins et al. | 244/158 R |

(List continued on next page.)

FOREIGN PATENT DOCUMENTS

| | | |
|---|---|---|
| 780295A2 | 6/1997 | (EP) . |
| 869063A1 | 10/1998 | (EP) . |
| 780295A3 | 11/1998 | (EP) . |

OTHER PUBLICATIONS

Jian–Guo Zhang; New Optical Fiber Data Buses for Avionics Applications; Proceedings of 1992 IEEE/AIAA 11$^{th}$ Digital Avionics Systems Conference, Seattle, WA USA Oct. 5–8, 1992, pp. 417–422 XP002143194 New York, NY USA p. 417, column 1—column 2 para 1; p. 421, column 1 para 2 p. 422; figure 4.

Label Ka A; Flanegan M; Marshall P; Dale C; Stassinopoulos E G; Spaceflight Experiences and Lessons Learned with NASA's First Fiber Optic Data Bus; Proceedings of 2$^{nd}$ European Conference Radiations and Their Effects on Devices and Systems (RADECS 93) 1994, pp. 221–224, XP002143195 New York NY, USA p. 22, column 1—column 2, para 2, figure 1.

(List continued on next page.)

*Primary Examiner*—Leslie Pascal
*Assistant Examiner*—Hanh Phan
(74) *Attorney, Agent, or Firm*—Noel F. Heal

(57) ABSTRACT

A standardized interface between a spacecraft backbone structure (48) and multiple spacecraft modules (26) that are coupled to the backbone structure mechanically, electrically and optically. The interface structure includes power connection pins (42 or 50) that connect to a power bus in the backbone structure, data signal pins (44) that connect to a conventional data bus in the backbone structure, and an optical connection (46 or 56) that connects to an optical data bus (60) in the backbone structure. Optionally, the interface also includes a wireless data bus (54) using infrared propagation along the backbone structure, and a radio-frequency (RF) microstrip connector (52) for transmission of data at radio frequencies. The optical data connection employs an optical interface unit (62) in each spacecraft module (26) to convert optical signals from the optical data bus (60) to corresponding electrical signals, and a cross-point switch (74) to distribute the signals to appropriate destinations on the module. The optical interface unit (62) also converts electrical signals to optical signals for transmission back onto the optical data bus (60). Optical signals may be wavelength division multiplexed onto the optical data bus (60), for which purpose the interface unit (62) also includes an optical demultiplexer (68) and an optical multiplexer (84).

5 Claims, 5 Drawing Sheets

U.S. PATENT DOCUMENTS

| | | | | |
|---|---|---|---|---|
| 5,726,786 | * | 3/1998 | Heflinger | 359/152 |
| 5,931,418 | * | 8/1999 | Eller et al. | 244/158 R |
| 5,961,076 | * | 10/1999 | Eller et al. | 244/158 R |
| 5,979,833 | * | 11/1999 | Eller et al. | 244/158 R |
| 6,172,783 | * | 1/2001 | Funada et al. | 359/163 |

OTHER PUBLICATIONS

Webb E, Cunningham M, Leath T T; The WARP: Wideband Advanced Recorder Processor for the New Millennium Programm E0–1; 1997 IEEE Aerospace Conference. Proceedings, vol. 4, 1997, pp. 471–478, XP002143196 New York NY, USA; p. 485, column 1, last para, p. 486, column 1, last para, figure 3, table 3.

* cited by examiner

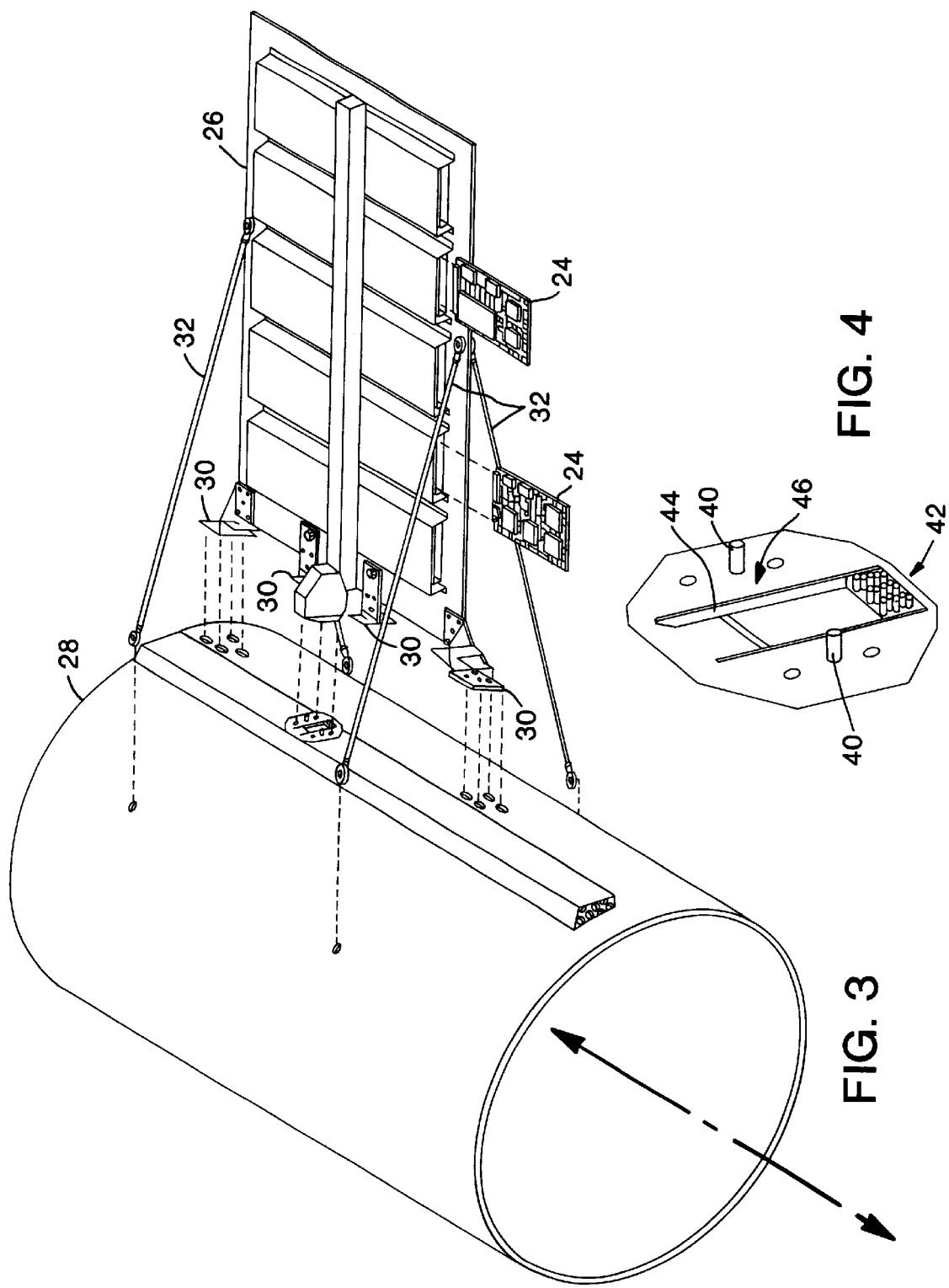

CONNECTOR INTERFACE FOR SPACECRAFT MODULES

CROSS-REFERENCE TO RELATED APPLICATION

This invention is related to the invention described and claimed in application Ser. No. 08/771,465, filed on Dec. 20, 1996, entitled "Backbone Interface for Modular Spacecraft."

BACKGROUND OF THE INVENTION

This invention relates generally to modular spacecraft engineering and design and, more particularly, to techniques for interconnecting spacecraft electronic equipment modules that are externally mounted on a core spacecraft structure. Conventional spacecraft designs have placed electronic equipment on panels located inside box-like modules, with the panels typically forming the walls of the modules. The modules are mounted onto a spacecraft and interconnected with extremely complex wiring harnesses. This approach makes spacecraft design, integration and testing a costly and time-consuming effort, and renders even small design changes difficult or practically impossible. Clearly, a more modular approach is called for, but efforts to provide a "standard" spacecraft bus, on which equipment and avionics modules are mounted, have not resulted in elimination of the wiring harness as the preferred interconnection medium. The present invention addresses these difficulties and provides an elegant solution to the problem.

SUMMARY OF THE INVENTION

The present invention resides in a backbone interface for use in a modular spacecraft having a core structure and a plurality of largely independent spacecraft modules. The backbone interface comprises a power bus extending along a spacecraft core structure, for coupling to connectors on modules plugged into the backbone interface and for supplying electrical power to the modules; an optical data bus also extending along the spacecraft core structure, for carrying data signals in optical form from one module to another; and an optical interface associated with each module, for converting optical signals from the optical data bus to electrical signals, directing the converted electrical signals to appropriate destinations on the module, and adding data signals derived from sources located on the module back onto the optical data bus.

The backbone interface of the invention may also comprise either or both of a conventional electrical data bus also extending along the spacecraft core structure, for coupling to data connectors on the modules plugged into the backbone interface, and a radio-frequency (RF) bus also extending along the spacecraft core structure, having a plurality of waveguide channels for selective coupling to connectors on the modules plugged into the backbone interface.

More specifically, the optical interface includes an optical demultiplexer to separate multiple optical channels carried on the optical data bus; a detector array for generating electrical signals from signals on the multiple optical channels; switching logic to determine module destinations for the electrical signals and for routing electrical signals generated on the module; a plurality of light sources coupled to the switching logic, to generate optical signals for coupling onto the optical data bus; and an optical multiplexer, for combining a plurality of optical signals from the light sources, for launching onto the optical data bus. In the presently preferred embodiment of the invention, the optical signals are wavelength division multiplexed onto the optical data bus. The optical demultiplexer generates multiple optical signals at different wavelengths, and the plurality of light sources include lasers operating at the same respective wavelengths as the multiple optical signals.

It will be appreciated from the foregoing that the present invention represents a significant advance in the field of spacecraft design and construction. In particular, the invention is a key to facilitating design, construction and modification of spacecraft, since it provides a standardized interface between a spacecraft core structure and a plurality of similar modules. Using the interface, each module is easily plugged into a backbone bus on the core structure, to provide a path for distribution of electrical power, command and control signals, and mission-specific data. An optical path provides for the transmission of large volumes of data from one spacecraft module to another, through an optical data bus incorporated into the backbone structure. A significant advantage of the standardized interface is that modules can be more easily designed, upgraded and replaced without disruptive redesign of mechanical, thermal and electrical interconnections between modules. Other aspects and advantages of the invention will become apparent from the following more detailed description, taken in conjunction with the accompanying drawings.

BRIEF DESCRIPTION OF THE DRAWINGS

FIG. 3 is an enlarged view similar to FIG. 2, but showing more detail of a single module in exploded relation to a spacecraft structure;

FIG. 4 is a further enlarged diagrammatic view of a standardized interface connector used in coupling the module and spacecraft structure of FIG. 3;

DESCRIPTION OF THE PREFERRED EMBODIMENT

Figure 1:
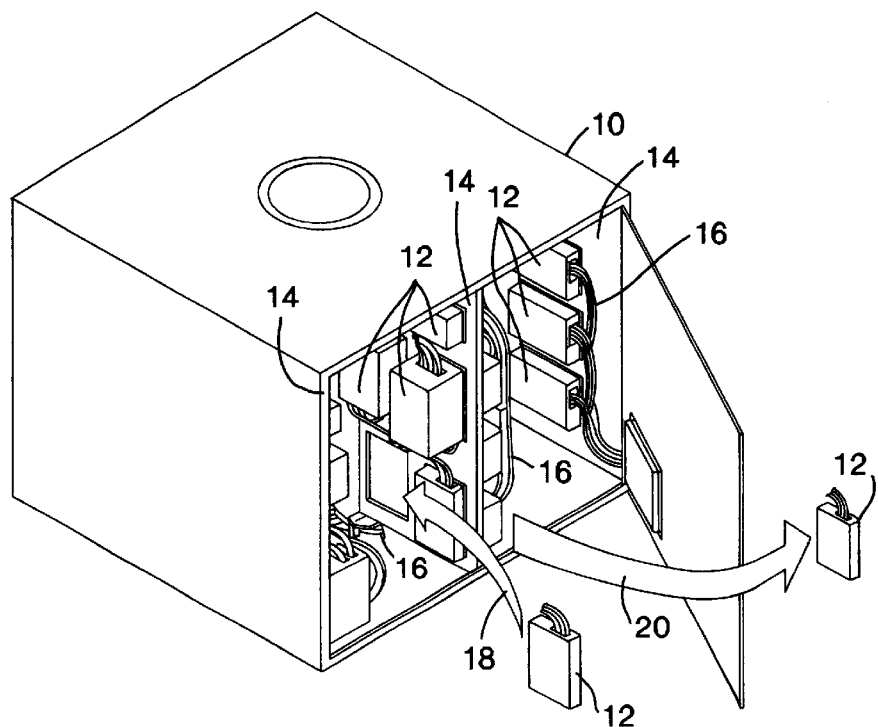
FIG. 1 is a diagrammatic view of a conventional box-like spacecraft module of the prior art.

As shown in the drawings for purposes of illustration, the present invention pertains to apparatus for interconnecting avionics modules in a modular spacecraft. Conventionally, avionics modules are housed in bulky boxes that are interconnected by complex wiring harnesses. In accordance with the invention, spacecraft avionics modules are externally mounted on a spacecraft core structure, which includes a backbone interface to which the modules are connected to obtain power, and to exchange data and radio-frequency (RF) or optical signals. Instead of a bulky and complicated wiring harness, the backbone interface provides a power bus, an optical signal bus and an RF signal bus, as will now be described in more detail.

FIG. 1 shows a conventional box-like housing, indicated by reference numeral 10, containing spacecraft avionics modules 12. Typically, the housing 10 contains multiple equipment panels 14, and on each panel there are mounted multiple modules 12. Wiring harnesses 16 interconnect the modules 12 and extend between panels 14, and may extend beyond the housing 10. When a new module 12 is inserted or removed, as indicated by the arrows 18 and 20, this action impacts the mechanical, electrical and thermal design at not just at module level, but at a panel and overall system level as well. Insertion of a new module may require repositioning existing modules, rewiring harnesses, and providing additional heat dissipation capacity. Design changes, therefore, typically result in unwanted delays and cost increases.

Figure 2:
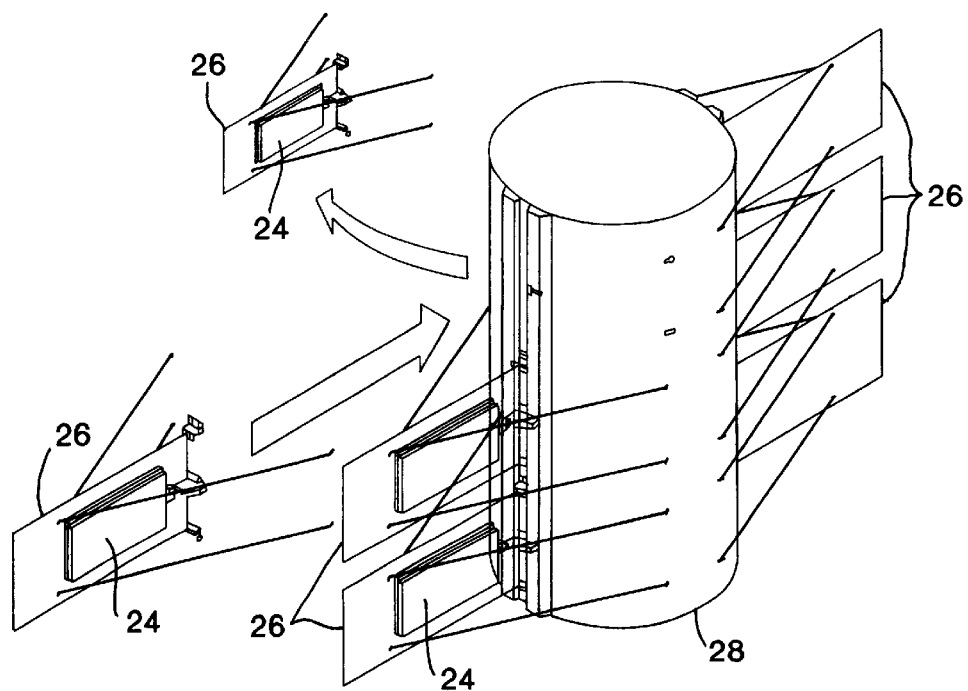
FIG. 2 is a diagrammatic view of a modular spacecraft architecture using the technology of the present invention.

In the environment of the present invention, as shown in FIG. 2, modules 24 are mounted on uniformly sized panel modules 26, which are attached in a generally radial configuration to a spacecraft core structure 28 or cylindrical shape. As best shown in FIG. 3, each panel module 26 is mechanically attached to the core structure 28 by means of mounting brackets 30 and supporting struts 32. More significantly from the standpoint of the present invention, each panel module 26 has a standardized interface connector 34, which couples to a corresponding connector 36 on the core structure 28. The connector 36 on the core structure is shown in more detail in FIG. 4. More specifically, the connector 36 includes a pair of alignment pins 40, a set of primary power pins 42, a standard dc (direct current) pin interface 44, and a fiber-optic interface 46. Running the length of the core structure is at least one "backbone" bus 48, for carrying power, data and other signals from one panel module 26 to another.

Figure 5:
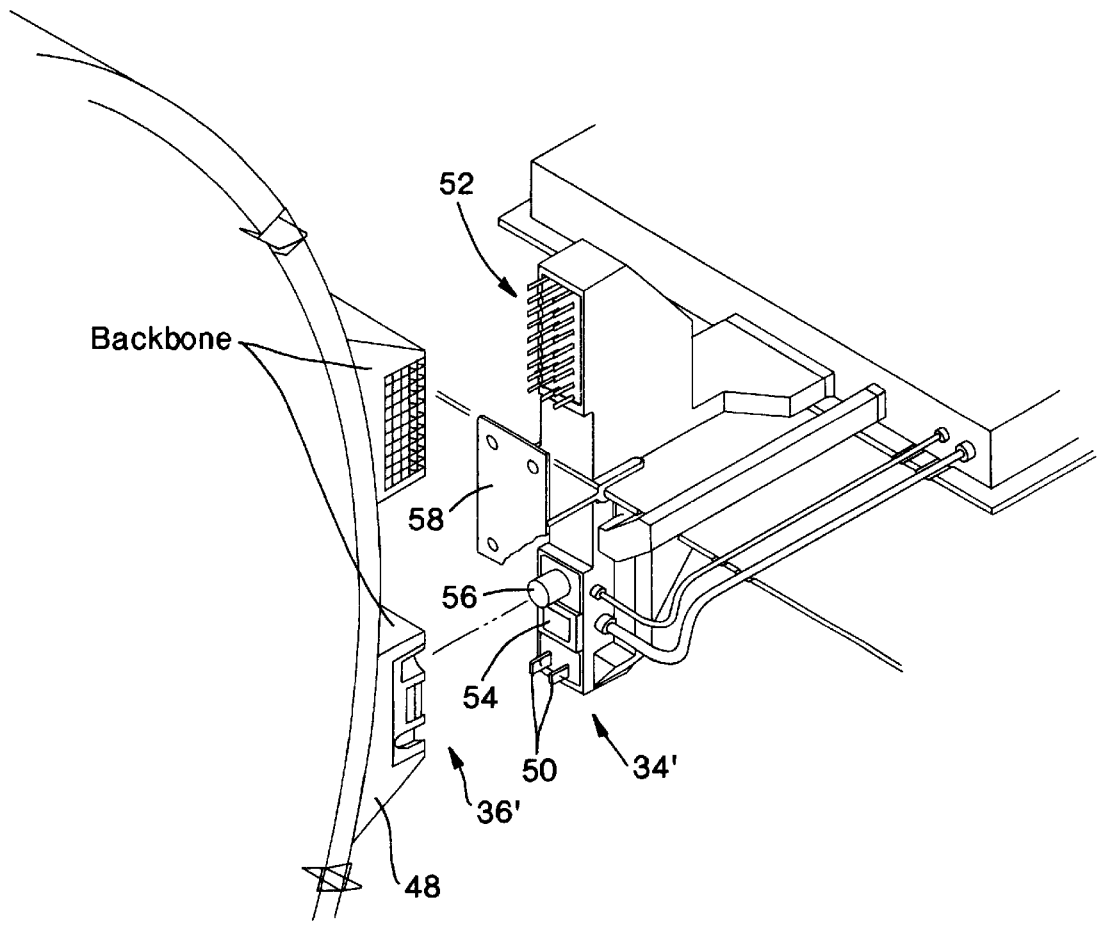
FIG. 5 is a diagrammatic view of a connector similar to FIG. 4, showing the module side of the connector.

FIG. 5 shows a different embodiment of the standardized interface connectors 34 and 36, indicated as 34' and 36', respectively. In this embodiment, the connectors include a pair of power connectors 50 similar to household power connectors, an RF microstrip interface 52 using a computer pin-like configuration, a wireless infrared data bus connector 54 comprising a sensor and a transmitter, and a digital fiber optic data bus connector 56 comprising a pin-like connector on the module that mates with a data carrying channel embedded in the backbone bus 48. The interface connectors 34' and 36' also have a mechanical interface 58 that snaps the connectors together in a connected configuration, ensuring that electrical, optical and mechanical coupling is made securely.

The standardized interface connector 34, 36 or 34', 36' provides services to all payload and spacecraft modules, and facilitates module changes, technology improvements and upgrades. In the embodiment of FIG. 5, the "household-like" power connectors 50 carry carries "raw" or unregulated direct current (DC) power from the backbone bus 48 to each of the connected panel modules 26. The wireless infrared data bus connector 54 carries spacecraft command and control signals distributed through the backbone bus 48. The RF microstrip interface 52 provides connections for multiple RF data-carrying channels also carried by the backbone bus 48. Finally, the digital fiber optic data bus connector 56 carries mission data over an optical channel embedded in the backbone bus 48. More details of this optical data channel are shown in FIGS. 6 and 7.

Figure 6:
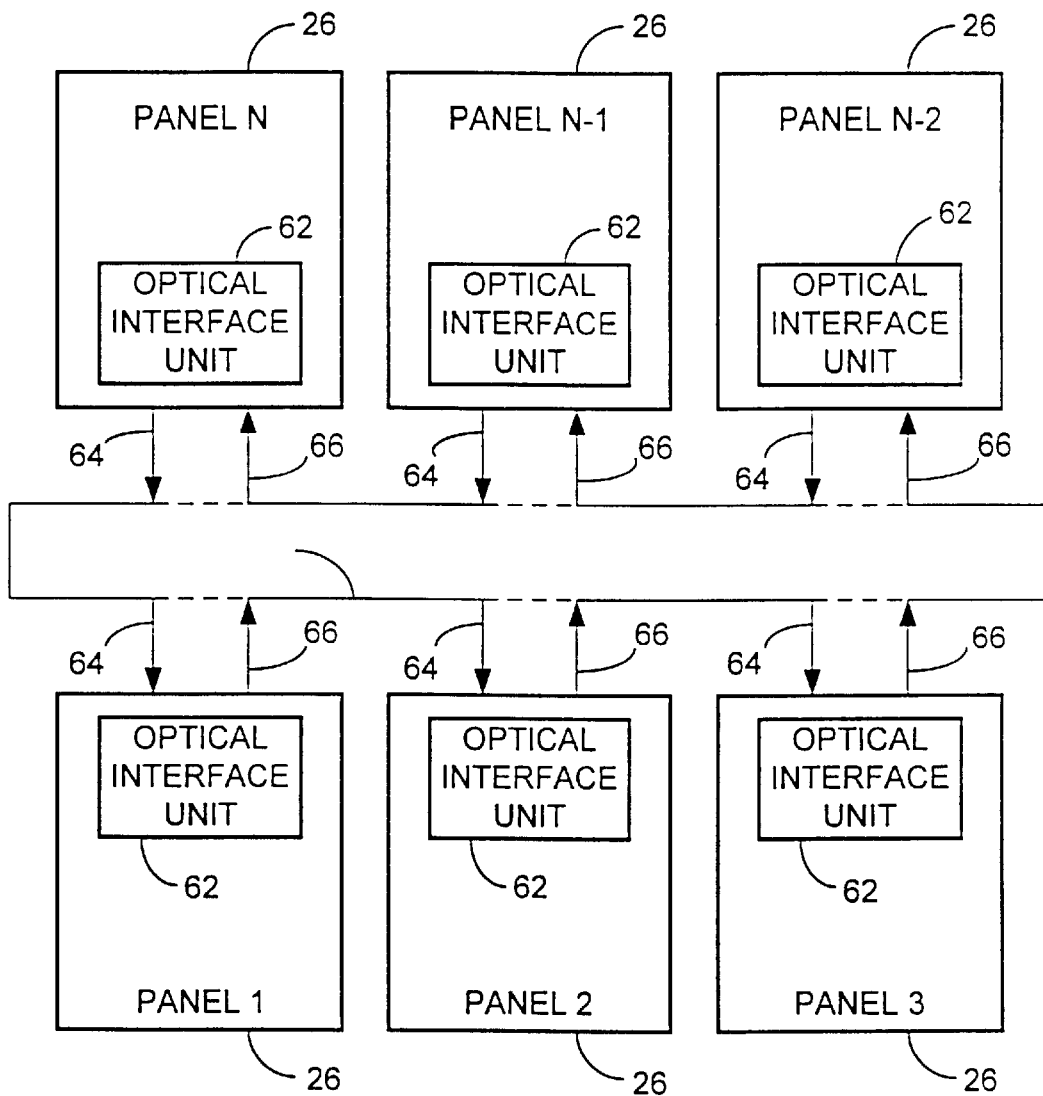
FIG. 6 is a block diagram depicting optical interconnection of panel modules through an optical data bus.

FIG. 6 shows multiple panel modules 26 connected to an optical data bus 60. Each panel module 26 includes an optical interface unit 62, which receives optical signals from the data bus 60, as indicated by lines 64, and transmits optical signals to the data bus, as indicated by lines 66. The data bus 60 allows for high-volume data communication between panel modules 26, for transmission of mission-specific data. It will be understood that one or more of the panel modules may include connections to transmitters for down-linking data to a ground station (not shown), or receivers for up-linking data from a ground station.

Figure 7:
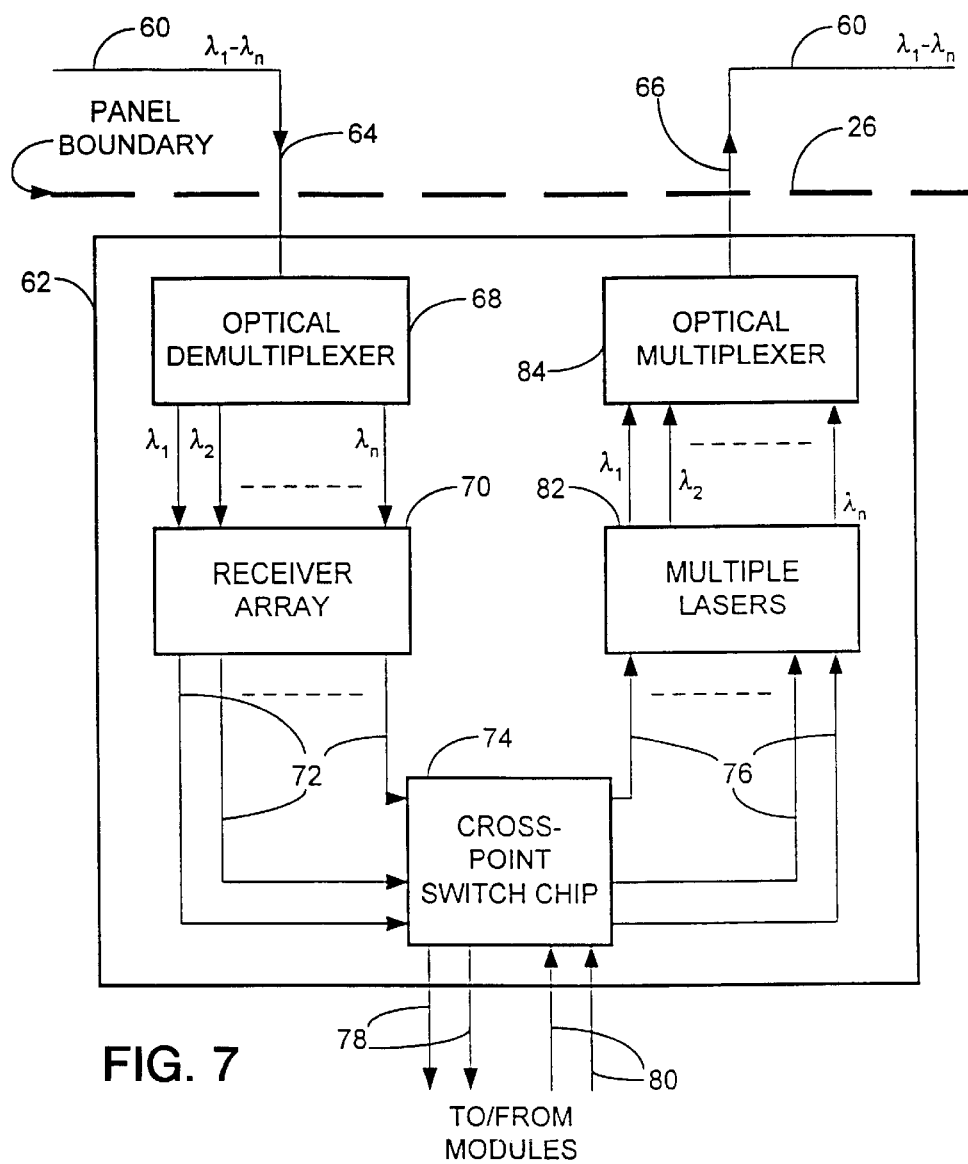
FIG. 7 is a block diagram showing the principal functions of an optical interface unit that is part of each panel module in FIG. 6.

FIG. 7 shows an optical interface unit 62 in more detail, together with connections to the optical data bus 60. In the illustrative embodiment of FIG. 7, the optical data bus 60 does not extend continuously along the backbone bus 48, but is, in effect, diverted through each panel module 26 through optical lines 64 and 66. Optical data signals are carried on the optical data bus at multiple wavelengths. Thus the data signals are wavelength data multiplexed on the data bus 60, which may be referred to as a wavelength data multiplexed backplane. Incoming optical data on line 64 is first demultiplexed in an optical demultiplexer 68, and the resulting separate optical signals are input to a receiver array 70, which includes a plurality of photo-electric detectors that convert the optical signals to electrical signals, as indicated by lines 72. These electrical signals are input to a cross-point switch 74 operating at a high data rate. The cross-point switch determines the destinations of the signals and directs the signals to their intended destinations on the panel module 26 with which this optical interface unit 62 is associated. Some of these signals may not be destined for a module located on this particular panel and will be passed through the cross-point switch 74 to electrical output lines 76. Data destined for modules located on this panel module 26 are switched onto lines 78. Data signals to be transmitted onto the data bus 60 are presented to the cross-point switch 74 on lines 80 and are routed onto selected communication channels carried on lines 76, each of which modulates one of a plurality of laser light sources 82 operating at different wavelengths. The optical outputs of these lasers are input to an optical multiplexer 84, where they are combined and then coupled onto the optical data bus 60 over optical line 66.

Figure 8:
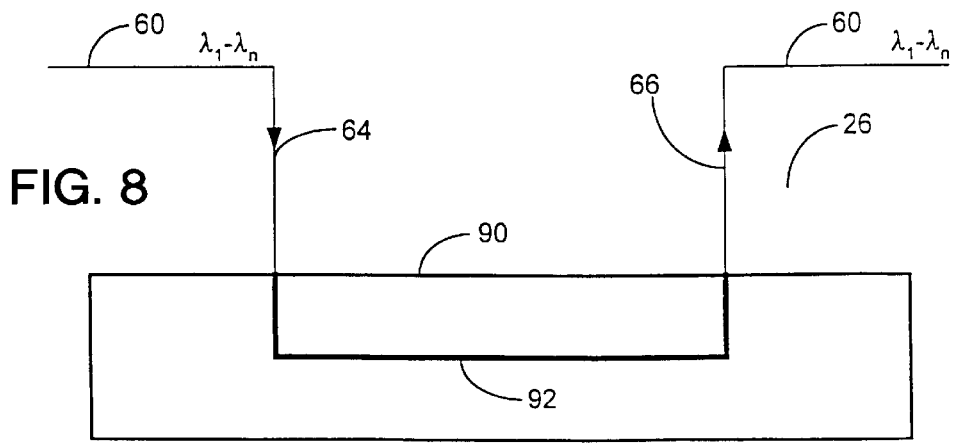
FIG. 8 is a block diagram showing a dummy panel module and optical interface unit, for use in otherwise empty panel module positions.

The embodiment of FIG. 7, has the advantages that it employs commercially available components and that no control signals need be transferred across the boundary between the data bus 60 and the panel module 26. Moreover, the interface units 62 can be standardized for all panel modules, and from one spacecraft to another if desired. Also, the optical interface is simplified because only a single optical fiber is needed for signals being "dropped" onto a panel module and only another single optical fiber is needed for all signals being "added" from the panel module to the data bus. The interface unit 62 regenerates the optical signals at each panel module 26, and can also be used to switch data signals to an additional backplane or data bus (not shown). For continuity of the data bus 60, each position in which a panel module 26 may be installed must have either an actual panel module or a dummy panel, illustrated at 90 in FIG. 8, containing an optical fiber 92 connecting lines 64 and 66. The dummy panel 90 is, of course, preferably smaller in size and weight than the actual panel modules 26.

It will be appreciated from the foregoing that the present invention represents a significant improvement in spacecraft architecture. In particular, the invention provides a standardized data, control and power interface between spacecraft modules and a spacecraft core structure. The standardized interface provides a selection of wireless infrared, microstrip and optical connectors, each of which couples to corresponding components of the backbone bus of the spacecraft core structure. It will also be appreciated that, although various embodiments of the invention have been illustrated and described in detail for purposes of illustration, a number of modifications are believed to be within the spirit and scope of the invention. Accordingly, the invention should not be limited except as by the appended claims.

What is claimed is:

1. For use in a modular spacecraft having a core structure and a plurality of largely independent spacecraft modules, a backbone interface, comprising:

a power bus extending along a spacecraft core structure, for coupling to connectors on modules plugged into the backbone interface and for supplying electrical power to the modules;

an optical data bus extending also extending along the spacecraft core structure, for carrying data signals in optical form from one module to another; and an optical interface associated with each module, for converting optical signals from the optical data bus to electrical signals, directing the converted electrical signals to appropriate destinations on the module, and adding data signals derived from sources located on the module back onto the optical data bus.

2. A backbone interface as defined in claim 1, and further comprising:

a conventional electrical data bus also extending along the spacecraft core structure, for coupling to data connectors on the modules plugged into the backbone interface.

3. A backbone interface as defined in claim 1, and further comprising:

a radio-frequency (RF) bus also extending along the spacecraft core structure, having a plurality of waveguide channels for selective coupling to connectors on the modules plugged into the backbone interface.

4. A backbone interface as defined in claim 1, wherein the optical interface includes:

an optical demultiplexer to separate multiple optical channels carried on the optical data bus;

a detector array for generating electrical signals from signals on the multiple optical channels;

switching logic to determine module destinations for the electrical signals and for routing electrical signals generated on the module;

a plurality of light sources coupled to the switching logic, to generate optical signals for coupling onto the optical data bus; and an optical multiplexer, for combining a plurality of optical signals from the light sources, for launching onto the optical data bus.

5. A backbone interface as defined in claim 4, wherein:

the optical signals are wavelength division multiplexed onto the optical data bus;

the optical demultiplexer generates multiple optical signals at different wavelengths; and the plurality of light sources include lasers operating at the same respective wavelengths as the multiple optical signals.

* * * * *